United States Patent Office 3,799,913
Patented Mar. 26, 1974

3,799,913
PRODUCTION OF HYDROCARBON RESIN COMPOSITIONS FROM ALPHA-METHYL STYRENE, INDENE AND VINYL TOLUENE
Harvey B. Wheeler, Pittsburgh, Anthony S. Andrews, McKees Rocks, and James A. Schlademan, Pittsburgh, Pa., assignors to Neville Chemical Company, Pittsburgh, Pa.
No Drawing. Filed Dec. 30, 1971, Ser. No. 214,434
Int. Cl. C08f 19/00
U.S. Cl. 260—80.78
14 Claims

ABSTRACT OF THE DISCLOSURE

Hydrocarbon resins are produced by polymerizing a reaction mixture containing alpha-methyl styrene, indene and vinyl toluene as the principal polymerizable constituents in the presence of a Friedel-Crafts type catalyst such as boron trifluoride. The alpha-methyl styrene/indene/vinyl toluene terpolymer or resin may advantageously be used with short and medium oil alkyd resins and other coating compositions in both air-dry and baking type finishes, especially where heat and ultraviolet light stability, drying time, gloss and gloss retention, water and caustic resistance, and leveling properties are important. The resin may also be used advantageously in hot melt adhesives and coatings and as a modifier in wax systems, especially where low odor, color stability, and viscosity stability are important.

BACKGROUND OF THE INVENTION

Field of the invention

This invention relates to hydrocarbon resin compositions, their production, and their uses.

Summary of the prior art

Synthetic resins such as thermoplastic hydrocarbon resins have long been used in coating and adhesive compositions. See, for example, United States Pats. 2,515,646, 2,582,425, 2,965,612, 3,000,868, and 3,485,807.

The search has continued for hydrocarbon resins which are compatible and suitable for use in such coatings and adhesives and which have improved performance characteristics including color, odor, compatibility with waxes and other resins such as ethylene-vinyl acetate copolymers, color and viscosity stability at elevated temperatures, ultraviolet (UV) light stability and, where alkyd and similar coatings are concerned, rapid drying time, and clarity and gloss of the coatings.

For example, resins such as the oil-soluble resin described in the above-mentioned U.S. Pat. 2,965,612 are typically of a darker color, higher odor, and lower thermal and ultraviolet stability than is desired. Other resins such as those described in the above-mentioned U.S. Pat. 3,000,868 are higher in cost, lower in compatibility with waxes and resins such as ethylene-vinyl acetate copolymers, than is desired, and are incompatible with short and medium oil alkyd coating compositions.

SUMMARY OF THE INVENTION

Accordingly, a primary object of the present invention is to provide novel hydrocarbon resins which do not give rise to or substantially alleviate the problems of the above-discussed prior art.

Another object of the present invention is to provide a hydrocarbon resin having improved color.

Another object of the present invention is to provide novel hydrocarbon resins having improved odor when compared to coumarone-indene resins.

Another object of the present invention is to provide novel hydrocarbon resins having improved compatibility with paraffin waxes and other resins such as ethylene-vinyl acetate copolymers when compared to alpha-methyl styrene homopolymer resins, alpha-methyl styrene/vinyl toluene copolymer resins, and coumarone-indene resins.

Another object of the present invention is to provide novel hydrocarbon resins having improved thermal and UV light stability when compared to vinyl toluene/coumarone-indene copolymer resins and coumarone-indene resins.

Another object of the present invention is to provide novel hydrocarbon resins having improved compatibility in short oil and medium oil alkyd resin coatings when compared to alpha-methyl styrene homopolymers, coumarone-indene resins, alpha-methyl styrene/vinyl toluene resins, and vinyl toluene/coumarone-indene resins.

Another object of the present invention is to provide novel hydrocarbon resins giving rise to faster dry times when incorporated in alkyd resin coatings.

Another object of the present invention is to provide novel hydrocarbon resins from a petroleum source rather than a coal tar source so as to avoid the problem caused by non-hydrocarbon contaminants such as tar bases and tar acids in the cold tar source.

Other objects of the present invention are to provide processes for producing or making such hydrocarbon resins as well as to provide processes and compositions utilizing these hydrocarbon resins in such areas as alkyd coatings and hot melt and adhesive compositions.

In accordance with the present invention, a hydrocarbon resin or terpolymer is produced or provided by a process which includes polymerizing a reaction mixture comprising as the principal polymerizable constituents at least about twenty percent alpha-methyl styrene, at least about ten percent indene and at least about ten percent vinyl toluene in the presence of a Friedel-Crafts type catalyst.

A primary aspect of the present invention is the surprising discovery that the alpha-methyl styrene/indene/vinyl toluene terpolymer or hydrocarbon resin of the present invention not only possesses compatibility with alkyd resin coatings but in addition gives rise to substantial improvements in drying times when incorporated or mixed into alkyd resin coatings.

Another primary aspect of the present invention is the discovery that these novel alpha-methyl styrene/indene/vinyl toluene resins have improved thermal and UV stability with respect to color and viscosity retention.

Another primary aspect of the present invention is that the novel hydrocarbon resins of the present invention have been found to have improved compatibility in paraffin wax and ethylene-vinyl acetate coating and hot melt compositions.

Other objects, aspects and advantages of the present invention will become apparent to one skilled in the art from the following description of the preferred embodiments.

DESCRIPTION OF THE PREFERRED EMBODIMENTS

As indicated above, the hydrocarbon resin of the present invention is produced by reacting or polymerizing a mixture containing alpha-methyl styrene, indene and vinyl toluene as the principal polymerizable constituents or monomers in the presence of a Friedel-Crafts type catalyst.

Alpha-methyl styrene, indene, and vinyl toluene are each well known per se and the manner in which they are produced, derived or obtained is not a part of the present invention.

For example, the polymerizable reaction mixture may be formed from essentially pure vinyl toluene. The ortho, meta and para isomers of vinyl toluene may be used singularly or in any combinations thereof in any proportions.

Typically, these three reactants or components (alpha-methyl styrene, indene and vinyl toluene) comprise at least about eighty percent of the total amount of polymerizable constituents or monomers of the reaction mixture, and preferably comprise above about ninety percent of the total amount of polymerizable constituents of the reaction mixture.

The term "principal polymerizable constituents" is used herein to define those monomers or compounds which taken singularly are present in the reaction mixture in an amount greater than any other single or particular compound or monomer which polymerizes during the polymerization reaction or process of the present invention.

The term "polymerizable constituents" is used herein to include alpha-methyl styrene, indene and vinyl toluene as well as those compounds or monomers which polymerize along with styrene, indene and vinyl toluene during the polymerization process of the present invention.

Non-limiting examples of other polymerizable constituents which may be in the reaction mixture, in addition to alpha-methyl styrene, indene and vinyl toluene, include styrene, 3-methylindene, coumarone, divinyl benzene, ethyl styrene, and beta-methyl styrene.

The principal polymerizable constituents (alpha-methyl styrene, indene, and vinyl toluene) and any other polymerizable constituents are fed or introduced to a reactor or reactor zone in proportions which may vary widely. The ratio of alpha-methyl styrene to indene may be, for example, from about 0.5 up to about five; the ratio of alpha-methyl styrene to vinyl toluene may be, for example from about 1.0 up to about fifteen.

The reaction mixture may comprise, for example, at least about twenty percent, e.g., from twenty percent to seventy-five percent alpha-methyl styrene, at least about ten percent, e.g., from about ten percent to sixty percent indene, at least about ten percent, e.g., from ten to thirty-five percent, vinyl toluene, and up to twenty percent of other polymerizable monomers or constituents.

In a particularly advantageous embodiment of the present invention, the reaction mixture may comprise from above about thirty percent up to about seventy percent alpha-methyl styrene, from above ten percent up to fifty percent indene, from above ten percent up to thirty percent vinyl toluene, and up to ten percent of other polymerizable constituents. The expressed percentages are by weight of the total amount of polymerizable monomers or constituents in the reaction mixture, and excludes any solvent or diluent which may be present in the reaction mixture or zone.

Typically, the reaction mixture is polymerized in the presence of from about twenty to about ninety percent, preferably from forty to sixty percent, of inert hydrocarbon material as a diluent or solvent. The expressed percentages are by weight of the total reaction mix, i.e., the total of the polymerizable constituents or monomers and the diluent.

The diluent or solvent is non-polymerizable, i.e., substantially free from resin-forming constituents which may cause discoloration in the resulting resin, under the conditions of polymerization of the present invention, but minor portions thereof may be incidentally incorporated into the resin hydrocarbon resin such as by alkylation. Typically, the diluent is a non-olefinic aliphatic or aromatic hydrocarbon composition which is in the liquid state under the conditions of polymerization. Preferably, the diluent is a $C_6$–$C_{10}$ aromatic hydrocarbon such as benzene, ethyl benzene, toluene, ethyl toluene, xylene, indene, cumene or trimethylbenzene. The diluent may also be selected from solvents for the resulting resins such as aliphatic and aromatic solvents, e.g., benzene, toluene, xylene, petroleum base solvent naphtha, hexane, heptane and mineral spirits.

In general, any acid-acting catalysts such as the Friedel-Crafts type catalysts may be used in the present invention. The term "Friedel-Crafts type catalyst" includes Friedel-Crafts catalysts per se such as Friedel-Crafts metal halides, e.g., boron trifluoride, stannic chloride, aluminum chloride, aluminum bromide, titanium tetrachloride, zinc chloride, ferric chloride, vanadium chloride, and phosphorus pentafluoride. Strong mineral acids, such as sulfuric acid, hydrofluoric acid, and acid treated clays may also be used.

One of the classes of acid-acting type catalysts which may be used as the polymerization catalyst of the present reaction includes the inorganic halide complex combinations in which the inorganic halide is combined in a molecular association with an organic compound. The latter organic compounds which form catalytic molecular association complexes with the inorganic Friedel-Crafts halides are generally selected from the inorganic oxygen-containing compounds such as the ketones, the alcohols, the carboxylic acids, the ethers, the esters, the organic nitro compounds, and others generally known to be capable of combining with the metal halides to form these catalytic complexes. Particularly desirable complexes of the latter type include the boron trifluoride etherates, alcoholates and ketonates.

Preferably, boron trifluoride either as a gas or solid or liquid complexes of boron trifluoride with a wide variety of organic compounds such as, for example, acetic or propionic acid, dialkyl ethers such as methyl ethyl ether, ethyl ether, and propyl ethers, lower alkyl alcohols and esters, and the like, are used. Borontrifluoride phenol complex and the various borontrifluoride hydrates may also be used.

Boron trifluoride and boron trifluoride ethyl etherate are most preferred.

In the broader aspects of the present invention, any amount of catalyst may be used. For example, the amount of catalyst may range from about 0.05 up to about ten percent. More typically, catalyst is used in an amount of from about 0.1 to about five percent, and preferably from about 0.5 to about two percent. These percentages are by weight of the reaction mixture, i.e., including the polymerizable constituents and any diluent.

For ease of addition, the catalyst may conveniently be made up as a liquid solution or dispersion in a portion of the diluent.

The polymerization reaction may be conducted over a wide range of temperatures depending upon the type of catalyst chosen and other process parameters as can be seen by one skilled in the art in view of the disclosure herein. For example, temperatures from about —50° C. up to about 150° C., preferably from about 10° C. to about 100° C., may be used. Usually, lower reaction temperatures tend to give hydrocarbon resin with a higher softening point, and higher reaction temperatures tend to give resins with darker coloring and lower softening points.

The pressures employed are not thought to be critical, with a pressure sufficient to prevent substantial loss by evaporation of the reactants and/or diluent typically being used. Subatmospheric, atmospheric and superatmospheric pressures may be employed.

Any conventional stirred or non-stirred reactor vessel may be employed for the polymerization reaction, and the processes of the present invention may be conducted in a batch, semi-continuous or continuous manner.

The polymerization reaction is typically maintained at reaction temperature until the desired degree of polymerization is reached. For example, significant yields of desired resin or polymer may be obtained after a reaction time of about fifteen minutes to about five hours, more typically about thirty minutes to three hours.

The resulting hydrocarbon resin is typically recovered by treating with clay, e.g., attapulgus clay, or fuller's earth, or a combination of hydrated lime and clay, to neutralize the catalyst, with the catalyst/clay sludge thereafter being removed by filtration Caustic or soda ash solutions may also be used to neutralize the catalyst.

The resin may then be recovered from the reaction mixture by conventional methods such as distillation.

A process for the neutralization and decoloration of polymerized oils is described in U.S. Pat. 3,371,075, which is incorporated herein by reference. Other methods which may be suitable for the recovery of catalyst are described in U.S. Pat. 2,515,646 and 2,562,425 which are incorporated herein by reference.

The hydrocarbon resin of the present invention may be characterized as an alpha-methyl styrene/indene/vinyl toluene thermoplastic hydrocarbon resin. The resin typically has a ring and ball softening point (ASTM-E-28) of at least 50° C., more typically between about 60° C. and 150° C., and most typically between about 90° C. and 110° C., and a resin color of not more than ten, typically about one to nine (Gardner scale—fifty percent resin in toluene). Molecular weight (number average) may range from about 350 to 1200, and more typically from about 500 to 900. The resin may have a relatively low degree of unsaturation corresponding to an iodine number of between about 10 and 70 (ASTM-D-1959, Wijs). Specific gravity at 25° C. may range from about 1.00 to 1.15, more typically 1.040 to 1.100, and refractive index at 25° C. may range from about 1.590 to 1.630, more typically to 1.600 to 1.670. The resin is soluble in a wide variety of solvents including typical aliphatic hydrocarbon solvents such as mineral spirits, n-heptane, methylcyclohexane, n-hexane, and n-decane; aromatic hydrocarbon solvents such as xylene, high flash naphtha, benzene, and chlorobenzene; ketones such as acetone and methyl ethyl ketone; esters such as methyl acetate, n-butyl acetate, and ethyl acetate; and ethers such as diethyl ether and dioxane.

The hydrocarbon resin of the present invention has widespread utility.

For example, the hydrocarbon resin of the present invention is compatible with short and medium oil alkyd resins including those based on soya, cottonseed, linseed, safflower and tall oils, and is also compatible with many other polymeric film formers including amine-formaldehyde resins such as urea-, melamine- and triazine-formaldehyde resins; polyesters; polyurethanes; and epoxy resins. When the hydrocarbon resin of the present invention is compared with the few other hydrocarbon resins that are compatible in these areas, it typically is superior with respect to heat stability, ultraviolet light stability, and has a faster drying time. When used as a replacement for a portion of the alkyd or polymer solids in a finished coating, the resin of the present invention typically contributes better gloss and gloss retention, increased water and caustic resistance, and better leveling properties.

In addition, the novel hydrocarbon resin of the present invention is excellently suited for use in hot melt adhesives and coatings and as a modifier in wax systems insofar as the resin of the present invention typically has very low odor and excellent color and viscosity stability at elevated temperatures.

The present invention is further illustrated by the following specific examples; all parts, percentages and ratios in the examples as well as in the claims and other parts of the specification are by weight unless otherwise indicated.

SPECIFIC EXAMPLES

The overall procedure for runs 1 to 7 was as follows:

The reaction mixture was formed and the catalyst was continuously added to the reaction mixture over a timed reaction period until the total desired amount of catalyst had been added.

The resulting reaction product mixture was pumped while hot (from about 40° C. to 75° C.) to a clay treater and the indicated amount of attapulgus clay or attapulgus clay and lime was added with agitation to neutralize the catalyst. The resulting mixture was then heated at about 100° C. to about 110° C. for one hour and the catalyst sludge was removed by filtration. Diluent and oily hydrocarbons were removed by steam distillation at a temperature of about 245° C. Other data and results are shown in Table I.

TABLE I

| Run number | 1 | 2 | 3 | 4 | 5 | 6 | 7 |
|---|---|---|---|---|---|---|---|
| Monomer in feed, percent of total polymerizables: | | | | | | | |
| Alpha-methyl styrene | 35.4 | 32.6 | 38.2 | 47.7 | 66.8 | 57.7 | 65.1 |
| Indene | 45.2 | 40.1 | 33.7 | 28.5 | 18.1 | 22.9 | 19.1 |
| Vinyl toluene | 11.7 | 25.7 | 22.4 | 18.9 | 12.0 | 15.3 | 12.6 |
| Other | 7.7 | 1.6 | 5.8 | 4.9 | 3.1 | 4.1 | 3.2 |
| Diluent,[1] percent of total reaction mixture | 53.1 | 38.1 | 45.0 | 45.0 | 44.9 | 45.9 | 43.5 |
| Catalyst | BF$_3$EE | BF$_3$EE | BF$_3$EE | BF$_3$EE | BF$_3$ | BF$_3$ | BF$_3$ |
| Catalyst added, percent | 0.89 | 0.89 | 0.84 | 0.84 | 0.48 | 0.50 | 0.20 |
| Catalyst addition time, minutes | 20 | 24 | 20 | 20 | 22 | 30 | 9 |
| Reaction: | | | | | | | |
| Temp., °C | 70-75 | 70-75 | 80-85 | 85-90 | 35-40 | 35-40 | 30-35 |
| Time, hours | 1.0 | 1.0 | 1.0 | 1.0 | 1.0 | 1.0 | 1.0 |
| Resin: | | | | | | | |
| Yield, (Percent conversion of monomers) | 97.0 | 85.2 | 99.2 | 91.4 | 84.1 | 82.6 | 77.2 |
| Properties: S.P. (R&B), °C | 108.0 | 108.0 | 93.5 | 92.0 | 97.5 | 104.5 | 101.2 |
| Color (Gardner—50% in toluene) | 10 | 8+ | 8+ | 7+ | 7+ | 9+ | 4+ |
| Std. Stoddard sol., °C | −16/−20 | −15/−19 | −23/−28 | −24/−30 | −12/−16 | −1/−7 | 75/−10 |

[1] Aromatic hydrocarbon liquid comprising chiefly xylene or xylene mixed with indane, cumene, trimethylbenzenes and ethyl toluenes.

The final hydrocarbon resin products of Runs 3, 5 and 7 were then blended with a paraffin wax and an ethylene-vinyl acetate copolymer to produce a hot melt coating. Each coating composition was then tested for heat stability. Data and Results are shown in Table II.

TABLE II.—RESIN HEAT STABILITY IN A HOT MELT BLEND

| Blend composition, g.: | | | |
|---|---|---|---|
| Paraffin wax | 150.0 | 150.0 | 150.0 |
| Ethylene-vinyl acetate copolymer | 75.0 | 75.0 | 75.0 |
| Resin of— | | | |
| Run 3 | 75.0 | | |
| Run 5 | | 75.0 | |
| Run 7 | | | 75.0 |
| Initial properties: | | | |
| Viscosity at 300° F., cps | 428 | 468 | 475 |
| Color (Gardner scale, 50% resin in toluene) | 4+ | 3 | 1+ |
| After 100 hrs. at 350° F. in vented metal container: | | | |
| Viscosity at 300° F., cps | 478 | 488 | 491 |
| Viscosity change, percent | 11.7 | 4.3 | 3.4 |
| Color (Gardner scale, 50% resin in toluene) | 11 | 10+ | 10 |

Alkyd resin coating compositions were prepared with an alkyd resin/hydrocarbon resin weight ratio of 70/30 and a total solids content of fifty percent. These solutions were drawn down on glass plates with a 0.5 mil drawdown bar and the resulting films air-dried (at about 23° C.

for about two hours) and examined for clarity. Other data and results are shown in Table III.

TABLE III.—RESIN COMPATIBILITY WITH SHORT AND MEDIUM OIL ALKYD RESINS

| Resin | Resin of— | | |
|---|---|---|---|
| | Run 3 | Run 5 | Run 7 |
| Alkyd: | | | |
| Cargill 8150 short tall oil alkyd resin | Clear | Clear | Clear. |
| Cargill B-242 short soya alkyd resin | do | do | Do. |
| Cargill S-31 medium safflower alkyd resin | do | do | Do. |
| Cargill A-3 medium linseed alkyd resin | do | do | Do. |

Drying times for air-dried (at about 23° C.) alkyd resin coatings using a medium safflower oil alkyd resin and the resin products of Runs 3, 5 and 7 were determined by forming (fifty percent solids in mineral spirits) coating compositions which also contained a conventional drier system comprising cobalt, calcium and zinc carboxylates and an anti-skinning agent. These coating compositions were drawn down on glass plates with a 0.5 mil drawdown bar and allowed to air-dry. Data and results are shown in Table IV.

TABLE IV.—DRY TIMES OF AIR-DRY COATINGS

| Coating composition, wt. percent: | | | | |
|---|---|---|---|---|
| Cargill S-31 medium safflower alkyd resin | 100 | 70 | 70 | 70 |
| Resin of— | | | | |
| Run 3 | | 30 | | |
| Run 5 | | | 30 | |
| Run 7 | | | | 30 |
| Properties of 0.5 mil film: | | | | |
| Set to touch time, min | ≤20 | ≤20 | ≤20 | ≤20 |
| Kraft tack free time, hr.:min | 1:00 | 2:20 | 2:20 | 2:00 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A process for the production of a hydrocarbon resin, which process comprises:
    polymerizing a reaction mixture comprising as the principal polymerizable constituents at least about twenty percent alpha-methyl styrene, at least about ten percent indene and at least about ten percent vinyl toluene in the presence of an acid-acting Friedel-Crafts type catalyst, wherein the principal polymerizable constituents comprise at least about eighty percent of the polymerizable constituents in the reaction mixture,
        removing the catalyst from the reaction mixture, and
        recovering the hydrocarbon resin from the reaction mixture,
    the hydrocarbon resin yielded by the polymerization reaction having a polymerized alpha-methyl styrene content of from about twenty percent to seventy-five percent, a polymerized indene content of from about ten percent to sixty percent and a polymerized vinyl toluene content of from about ten percent to thirty-five percent, and having a ring and ball softening point of at least about 50° C., an iodine number (Wijs) of between about 10 and 70, a specific gravity at 25° C. of from about 1.00 to 1.15 and a refractive index at 25° C. of from 1.590 to 1.630.

2. The process of claim 1 wherein the reaction mixture is polymerized in the presence of from about twenty to about ninety percent inert diluent; and wherein the reaction temperature is from about 10° C. to about 100° C.

3. The process of claim 1 wherein the Friedel-Crafts type catalyst is boron trifluoride or the ethyl etherate thereof.

4. A process for the production of an alpha-methyl styrene/indene/vinyl toluene terpolymer, which process comprises:
    polymerizing at a temperature of about −50° C. to about 150° C. a reaction mixture comprising from about twenty percent to seventy-five percent alpha-methyl styrene, from about ten percent to sixty percent indene, and from about ten percent to thirty-five percent vinyl toluene, wherein the alpha-methyl styrene, indene, and vinyl toluene comprise at least about eighty percent of the polymerizable constituents in the reaction mixture, in the presence of from about twenty to about ninety percent inert diluent and from 0.05 up to about ten percent of a Friedel-Crafts metal halide catalyst until a terpolymer having a polymerized alpha-methyl styrene content of from about twenty percent to seventy-five percent, a polymerized indene content of from about ten percent to sixty percent and a polymerized vinyl toluene content of from about ten percent to thirty-five percent, an iodine number (Wijs) of between about 10 and 70, a specific gravity at 25° C. of from about 1.00 to 1.15 and a refractive index at 25° C. of from 1.590 to 1.630, and a ring and ball softening point of at least about 50° C. is produced,
    the process further comprising removing the catalyst from the reaction mixture and recovering the hydrocarbon resin from the reaction mixture.

5. The process for the production of a thermoplastic hydrocarbon resin, which process comprises:
    reacting by polymerizing a mixture comprising as the principal polymerizable constituents from above about 30 percent up to about seventy percent alpha-methyl styrene, from above about ten percent up to fifty percent indene, and from above about ten percent up to thirty percent vinyl toluene, wherein the alpha methyl styrene, indene, and vinyl toluene comprise at least about eighty percent of the polymerizable constituents in the reaction mixture, in the presence of from about forty percent to sixty percent of an inert liquid $C_6$ to $C_{10}$ aromatic hydrocarbon diluent and from 0.5 to about two percent of a Friedel-Crafts type catalyst selected from the group consisting of boron trifluoride and the ethyl ethereate thereof for a period of about thirty minutes to three hours;
    contacting the resulting reaction mixture with clay to neutralize the catalylist;
    filtering the resulting mixture to remove the catalyst and clay; and
    distilling the filtered material and recovering a solid hydrocarbon resin having a polymerized alpha-methyl styrene content of about thirty percent up to about seventy percent, a polymerized indene content of about ten percent up to about fifty percent, and a polymerized vinyl toluene content of about ten percent up to about thirty percent, wherein the polymerized alpha methyl styrene, the polymerized indene and the polymerized vinyl toluene comprise at least about eighty percent of the hydrocarbon resin, and having a resin (Gardner scale—50% resin in toluene) of not more than 10, an iodine number (Wijs) of between about 10 and 70, a specific gravity at 25° C. of from about 1.00 to 1.15, a refractive index at 25° C. of from 1.590 to 1.630, and having a ring and ball softening point between about 90° C. and 110° C.

6. The proces of claim 5 wherein the principal polymerizable constituents comprise at least about ninety percent of the polymerizable constituents in the reaction mixture.

7. A process for the production of a hydrocarbon resin, which process comprises:
    a polymerizing at a reaction temperature of about −50° C. to about 150° C. a reaction mixture consisting essentially of from about twenty percent to seventy-five percent alpha-methyl styrene, from about ten percent to sixty percent indene, and from about ten percent to thirty-five percent vinyl toluene in the presence of from about twenty percent to about ninety percent inert diluent and from 0.05 percent up to about ten percent of an acid-acting Friedel-Crafts type catalyst, removing the catalyst from the reaction mixture, and recovering the hydrocarbon resin from the reaction mixture, the hydrocarbon resin having a polymerized alpha-methyl styrene content of from about twenty percent to seventy-five percent, a polymerized indene content of from about ten percent to sixty percent and a polymerized vinyl toluene content of from about ten percent to thirty-five percent, and having a ring and ball softening point of between about 60° C. and 150° C., an iodine number (Wijs) of between about 10 and 70, a specific gravity at 25° C. of from about 1.00 to 1.15 and a refractive index at 25° C. of from 1.590 to 1.630.

8. A process according to claim 7 wherein the reaction temperature is from about 10° C. to about 100° C.; wherein the reaction mixture to be polymerized comprises from above about thirty percent up to about seventy percent alpha-methyl styrene, from above about ten percent up to fifty percent indene, and from above about ten percent up to thirty percent vinyl toluene; wherein the reaction mixture is polymerized in the presence of from about forty percent to sixty percent of a $C_6$-$C_{10}$ aromatic hydrocarbon diluent; and wherein the polymerization is conducted in the presence of from about 0.5 percent to about two percent of a Friedel-Crafts metal halide catalyst until a terpolymer having a ring and ball softening point of between about 90° C. and 110° C. produced.

9. A hydrocarbon resin having a polymerized alpha-methyl styrene content of about twenty percent to seventy-five percent, a polymerized indene content of about ten percent to sixty percent, and a polymerized vinyl toluene content of about ten percent to thirty-five percent, wherein the polymerized alpha-methyl styrene, the polymerized indene and the polymerized vinyl toluene comprise at least about eighty percent of the hydrocarbon resin, and having a ring and ball softening point of at least 50° C. and a resin color (Gardner scale—50% resin in toluene) or not more than ten, an iodine number (Wijs) of between about 10 and 70, a specific gravity at 25° C. of from about 1.00 to 1.15 and a refractive index at 25° C. of from 1.590 to 1.630.

10. A thermoplastic hydrocarbon resin of claim 9 consisting essentially of alpha-methyl styrene/indene/vinyl toluene terpolymer and having a ring and ball softening point between about 60° C. and 150° C., a molecular weight (number average) of from about 350 to 1200, and a resin color (Gardner scale—fifty percent resin in toluene) of about one to nine.

11. The resin of claim 10 wherein the softening point is between about 90° C. and 110° C. and the molecular weight is from about 500 to 900.

12. A hydrocarbon resin having a polymerized alpha-methyl styrene content of from about twenty percent to seventy-five percent, a polymerized indene content of from about ten percent to sixty percent and a polymerized vinyl toluene content of from about ten percent to thirty-five percent, and having a ring and ball softening point of between about 60° C. and 150° C., an iodine number (Wijs) of between about 10 and 70, a specific gravity at 25° C. of from about 1.00 to 1.15 and a refractive index at 25° C. of from 1.590 to 1.630.

13. A hydrocarbon resin according to claim 12 wherein the ring and ball softening point is between about 90° C. and 110° C., wherein the specific gravity at 25° C. is from 1.040 to 1.100, and wherein resin color (Gardner scale—fifty percent in toluene) is not more than about ten.

14. A hydrocarbon resin according to claim 13 wherein the polymerized alpha-methyl styrene, the polymerized indene and the polymerized vinyl toluene comprise at least about eighty percent of the hydrocarbon resin.

References Cited
UNITED STATES PATENTS

| | | | |
|---|---|---|---|
| 3,484,422 | 12/1969 | Scordiglia | 260—82 |
| 3,640,977 | 2/1972 | Gozenbach | 260—80.78 |

JOSEPH L. SCHOFER, Primary Examiner

E. J. SMITH, Assistant Examiner

U.S. Cl. X.R.

260—22 CB, 28.5 A, 33.6 R

UNITED STATES PATENT OFFICE
CERTIFICATE OF CORRECTION

Patent No. 3,799,913            Dated March 26, 1974

Inventor(s) Wheeler et al

It is certified that error appears in the above-identified patent and that said Letters Patent are hereby corrected as shown below:

<u>IN THE CLAIMS</u>

Column 8, line 74, before "polymerizing" delete "a".

Column 9, line 36, after "110°C." insert -- is -- .

Column 10, line 1, change "or" to -- of -- .

Signed and sealed this 16th day of July 1974.

(SEAL)
Attest:

McCOY M. GIBSON, JR.            C. MARSHALL DANN
Attesting Officer                 Commissioner of Patents